Patented June 1, 1948

2,442,741

UNITED STATES PATENT OFFICE 2,442,741

HIGH VISCOSITY DAMPING FLUID

John D. Morgan, South Orange, and Russell E. Lowe, East Orange, N. J., assignors to Cities Service Oil Company, New York, N. Y., a corporation of Pennsylvania No Drawing. Application September 6, 1945, Serial No. 614,823

2 Claims. (Cl. 252—78)

This invention relates to improvements in damping fluids, or what are sometimes referred to as dash-pot oils.

The use of liquids for damping mechanical vibration and for resisting rapid mechanical movement is so conventional and expedient as hardly to require more than mention. Thus door checks, dash-pots for electrical switching apparatus, and the like, all depend upon the resistance to flow of a liquid for their effectiveness. It is likewise common practice to submerge the bimetallic element of an indicating thermometer, or thermostatic switch, in a liquid which serves to protect that delicate mechanism against mechanical shock as well as to limit jiggling of the indicating pointer or operating shaft to which it is attached. In instances of this latter kind, and there are many which are comparable to the one mentioned, the damping fluid which is employed must have a fairly high viscosity at ordinary and at elevated temperatures so that it may properly perform its intended functions. Conversely, it must have exceptionally low pour and freezing points so that it will not become so thickened under conditions of extreme cold as to interfere with movement of the bimetallic element in response to temperature change. It is further essential that the damping liquid should be highly immobile, having little or no tendency to creep, or to form droplets which may be shaken from the thermometer casing by mechanical vibration. Commercial grades of castor oil, and particularly the acetylated castor oils, have proven satisfactory for many uses of this general kind, but the freezing points of these liquids are so high as to render them highly unsuitable for use in thermometers designed for indicating very low temperatures. Furthermore, these vegetable oils oxidize rather easily, and undergo other chemical reactions which result in a gradual change of their physical properties in the course of time. Various other liquids which have been tried as thermometer damping fluids have been found to be wanting in or of another essential qualification.

The principal object of the present invention is to provide a liquid which has an appropriately high viscosity at ordinary and elevated temperature, so that it may dampen mechanical vibration in a thermometer element or the like, and which will retain a sufficient degree of fluidity to allow for proper operation of the bimetallic element of the thermometer at extremely low temperatures of the order of −100° F.

It is a further object of the invention to provide a fluid of the foregoing kind which will stay where it is put, wetting the element and surrounding casing so that it will not form droplets to be shaken out of the device when it is subjected to heavy vibration, and which yet has little or no tendency to creep along the pointer shaft and to pass out through the opening in the thermometer dial.

Another object of the invention is to provide a liquid having in addition to all of the foregoing characteristics, a high degree of chemical stability, so that it undergoes neither oxidation, polymerization, or other chemical reaction of a nature such as to change its essential physical properties, and which has no corrosive action upon the brass, steel, aluminum, and the common metals of construction.

We have discovered that solutions of from forty to sixty percent by weight of tri octyl phosphate, and from sixty to forty per cent by weight of a mixture of approximately equal parts of octyl-decyl esters of methacrylic acid polymerized to a molecular weight of about 10,000, have viscous properties, low temperature characteristics, and other physical and chemical attributes such as to render them particularly suitable for use as damping fluids for bimetallic thermometers and similar mechanical devices. It will be recognized that these ingredients are readily available, the latter being a commercial mixture of the identified methacrylic esters, which is sold under the trade name "Acryloid HF-45"; and since these liquids are mutually compatible, no special problems arise in the preparation of the desired final solutions. Furthermore, the use of the relatively pure chemicals results in finished products of uniform character which vary little from lot to lot, and which require no special purification or other after treatment.

One composition which has been prepared in accordance with the invention consists of about fifty per cent by weight of the tri octyl phosphate and about fifty per cent of the identified methacrylic polymer mixture. The resulting solution is a bland liquid having a viscosity of about 261 centistokes at 100° F., that is to say, of the order of thickness of U. S. P. castor oil. It is therefore entirely adequate from this point of view for damping vibration of bimetallic thermometer elements. Unlike castor oil, however, the solution is free flowing at −70° F., and is sufficiently mobile at about −100° F. that a $\frac{1}{16}$ inch brass shaft will turn freely when submerged in it, without binding or excessive friction. In addition, this composition is a highly stable one, showing no tendency to oxidize or polymerize under any conceivable conditions of usage, and does not attack brass, steel, or aluminum and its alloys.

The adequacy of this solution as a vibration dampener was tested in a number of "Weston" bimetallic thermometers. Thus the stems of a selected group of the thermometers were filled with the liquid instead of the usual acetylated castor oil compound to form a cushion for the helically bound bimetallic element, and the thermometers were then subjected to many hours of continuous vibration approximating that which it attains in military aircraft under a wide variety of temperature conditions. It was found that even at very high temperatures, several hundred degrees F., the liquid retained sufficient viscosity to protect the delicate bimetallic element from shock fully as well as castor oil compounds which are normally used. At the other extreme, it was demonstrated that the solution retains a sufficient degree of mobility not to interfere with proper operation of the bimetallic element in indicating temperature change. Thus at −70° F. the liquid was still free flowing, at −94° F. sufficiently mobile to place no drag upon the thermo-responsive element, and even at 120° F. it did not appear that the liquid was so thick as to interfere with proper operation of the thermometer.

Another property of vital importance which was demonstrated in repeated tests was the ability of our composition to stay where it was put, namely in the stem of the thermometer. We found that the liquid wet the stem and pointer shaft of the device and stuck to those parts, thus overcoming the objection to other compounds which we have tried, of forming droplets which were shaken out of the stem when the thermometer was subjected to heavy vibration. Of equal importance, it appeared that the viscosity of the composition, even at high temperatures, was sufficient to overcome any tendency on its part to creep along the pointer shaft and escape through the central opening in the thermometer dial. Finally, the evaporation rate of the fluid, which has been determined to be somewhat under 0.0013 gram per square centimeter of exposed surface after 100 hours at 212° F. is so extremely low that little or none will pass out of the instrument as vapor.

The example composition was prepared for the specific use which has been discussed above, namely, that of a damping fluid for bimetallic thermometers. It will readily be appreciated, however, that this composition has equal utility in a wide variety of applications which present substantially the same requirements. Thus, it may be used in solving any damping problem which requires a liquid of fairly high viscosity at ordinary temperatures and a fairly great mobility under conditions of extreme cold. We have further found that other solutions having about the same low temperature properties as the example composition, and greater or lesser viscosity, may be prepared by adjusting the proportions of the methacrylic polymer and tri octyl phosphate ingredients within the limits mentioned above. Where, for instance, a thinner solution is wanted, that is to say, one having a lesser viscosity at 100° F., the percentage of methacrylic polymer may be reduced and that of the tri octyl phosphate proportionately increased, within the limits specified. Such a liquid, it will be noted, will not only be thinner at ordinary temperatures but will have slightly lower pour and freezing points, than the example composition. Conversely, of course, liquids of higher viscosity at 100° F. may be obtained by increasing the amount of methacrylic polymer which is employed in relation to the tri octyl phosphate towards the upper limits mentioned above. While the pour and freezing points of these liquids will be less than those of the example composition, the loss of this property will not be substantial, and these liquids will remain free flowing at temperatures of around −60° F. and will retain considerable mobility at very much lower temperatures.

Having described our invention in its preferred aspects and illustrated it by way of specific example, what we claim as new and useful is:

1. A damping fluid comprising a solution of from about forty to sixty per cent by weight of tri octyl phosphate, and from sixty to forty per cent by weight of a commercial mixture of about equal parts by weight of the octyl-decyl esters of methacrylic acid polymerized to a molecular weight of about 10,000.

2. A damping fluid comprising about fifty per cent by weight of tri octyl phosphate, and about fifty per cent by weight of a mixture of about equal parts by weight of octyl-decyl esters of methacrylic acid polymerized to a molecular weight of about 10,000, said fluid being free flowing at −80° F.

JOHN D. MORGAN.
RUSSELL E. LOWE.

REFERENCES CITED

The following references are of record in the file of this patent:

UNITED STATES PATENTS

| Number | Name | Date |
|---|---|---|
| 2,058,899 | Matheson | Oct. 27, 1936 |
| 2,091,627 | Bruson | Aug. 31, 1937 |
| 2,236,662 | Wright | Apr. 1, 1941 |
| 2,241,531 | Wiezevich | May 13, 1941 |
| 2,245,649 | Caprio | June 17, 1941 |
| 2,340,073 | Morgan | Jan. 25, 1944 |